(12) United States Patent
Qian et al.

(10) Patent No.: US 7,215,864 B1
(45) Date of Patent: May 8, 2007

(54) LOW-COST PORTABLE FIBER-OPTIC CONNECTOR CLEANER

(75) Inventors: Charles Qian, Gilbert, AZ (US);
Katherine X. Liu, Tucson, AZ (US)

(73) Assignee: All Optronics, Inc.

( * ) Notice: Subject to any disclaimer, the term of this patent is extended or adjusted under 35 U.S.C. 154(b) by 0 days.

(21) Appl. No.: 11/492,362

(22) Filed: Jul. 24, 2006

(51) Int. Cl.
*G02B 6/00* (2006.01)

(52) U.S. Cl. ......................................... 385/134; 385/85

(58) Field of Classification Search ................. 385/58, 385/72, 75, 85, 134, 147
See application file for complete search history.

(56) References Cited

U.S. PATENT DOCUMENTS

2005/0105859 A1\* 5/2005 Gerhard ...................... 385/85

2006/0171641 A1\* 8/2006 Zhang et al. ................. 385/85

\* cited by examiner

*Primary Examiner*—Hemang Sanghavi

(57) ABSTRACT

A method and a system for cleaning fiber-optic connectors utilizing compressed-gas cans are disclosed. In one preferred embodiment, a solvent delivery sub-system (200) consisting of a fiber-optic connector interfacing unit (250) and a solvent spraying device (260) is reviewed. In another preferred embodiment, a solvent/contaminant removal sub-system (300) comprising of a compressed-gas can (340), a pressure regulator (345), a particle filter (347), a heating element (349), and a fiber-optic connector interfacing unit (310) is detailed. An additional preferred embodiment (400) is disclosed wherein the solvent delivery and removal sub-systems being integrated. For both the solvent delivery and the solvent/contaminant removal sub-systems, the compressed-gas cans may be obtained commercially. The improved art disclosed herein offers an effective and low cost solution to cleaning fiber-optic connectors.

45 Claims, 2 Drawing Sheets

LOW-COST PORTABLE FIBER-OPTIC CONNECTOR CLEANER

STATEMENT REGARDING FEDERAL RIGHTS

This invention was made with government support under Contract No. N68335-05-C-0045 awarded by the U.S. Department of Defense. The government may have certain rights in the invention.

BACKGROUND OF THE INVENTION

1. Field of the Invention

The present invention relates generally to fiber-optic connector cleaning systems and more particularly to a method and a portable apparatus for cleaning fiber-optic connectors utilizing solvent and compressed-gas cans.

2. Background Art

Fiber-optic cables are capable of transmitting data at very fast rates with minimum signal loss over long distances thereby offer distinct advantages over traditional copper based wires and cables. As such, fiber-optic cables are increasingly used in a host of applications in areas such as voice and data communications, imaging, aviation, and security. One of the bottlenecks that substantially limited the proliferation of the optical fiber cables is the less than desirable user friendliness of the fiber-optic connectors. The ends of these fiber-optic connectors where optical fiber cables are terminated and interfaced must be kept clean from foreign objects such as dusts, dirt, and oil to prevent signal lost. In fact, for some critical applications, it is well known that prior to each insertion, the ends of the mating connectors must be inspected, and cleaned if necessary, to ensure satisfactory performance.

Although cleaning fiber-optic connectors is critical to the well being of fiber-optic cable links, there are only limited technologies associated with cleaning fiber-optic connectors. In particular, there is a need to develop effective, inexpensive means to clean a female fiber-optic connector where the end-face of the fiber-optic connector is recessed inside of an alignment-sleeve. A prior art fiber-optic connector cleaning method was disclosed in U.S. Pat. No. 6,821,025 issued on Nov. 23, 2004 to Gerhard. This prior art appears to be most relevant to the present invention and is thereby included herein by ways of reference.

As detailed in the aforementioned reference, the prior art fiber-optic cleaning device is depicted in FIG. 1. The cleaning device (100) consists of a connector interfacing block (110) which is in fluid communication with a cleaning solvent reservoir (not shown), a source of compressed air (not shown), and a vacuum suction pump (not shown), through interconnected channels (150), (130), and (170), respectively. One of the key elements of this prior art cleaning device is a solvent/air delivery coaxial nozzle (135, 155) that has to be precisely machined and assembled to control the amount of solvent delivered while providing adequate flow of the compressed air to dry the connector end-face.

Improvements of the prior art in several areas are desirable and may prove to be beneficial. For instance, the prior art device requires the use of a sophisticated (hence more expensive) air compressor and a vacuum pump that substantially limits device portability and its use in low cost commercial applications. Additionally, the prior art device incorporates an interconnected solvent delivery and compressed air/vacuum drying design that substantially limits the type of the solvent that can be used and device operating temperature. There is a need therefore to make improvements so that a portable, low cost fiber-optic connector cleaning device can be made.

SUMMARY OF THE INVENTION

The present invention discloses an improved method and apparatus for cleaning fiber-optic connectors. In accordance with one of the preferred embodiments, a solvent delivery sub-system of an improved fiber-optic connector cleaner deposits a limited amount of solvent to the optical end-face of the connector. The disclosed sub-system consists of an interfacing tube, a solvent reservoir, an interconnected compressed-gas can, a mist generating nozzle, and a hand operated switch/valve. The interfacing tube is inserted into the alignment sleeve of the fiber-optic connector and is attached to the solvent-mist generating unit through a solvent limiting funnel. By activating the switch/valve of the compressed-gas can, a jet of solvent-mist is delivered to the end-face of the fiber-optic connector and thereby deposits a limited amount of solvent onto the surface to be cleaned.

In another preferred embodiment, a solvent/contaminant removal sub-system of an improved fiber-optic connector cleaner consists of an interfacing block and an interconnected compressed-gas delivering unit. The interfacing block has an interfacing tube to be inserted into the fiber-optic connector and two interconnecting channels for compressed-gas delivery and solvent/contaminant removal. The compressed gas from a gas can is in fluid communication with the interfacing block through a pressure regulator, a particle filter, and a heating element. Heated and filtered compressed-gas at a substantially reduced pressure is forced through the alignment sleeve to the fiber-optic connector end-face thereby carrying away dust, dirt, oil deposit, and the solvent.

In an additional preferred embodiment, an improved fiber-optic connector cleaner consists of an interfacing block, solvent delivery unit and compressed-gas delivery unit. The interfacing block has an interfacing tube to be inserted into the fiber-optic connector and three interconnecting channels for solvent-mist delivery, compressed air delivery, and solvent/contaminant removal, respectively. The solvent delivery unit consists of a solvent interfacing tube, a solvent reservoir, an interconnected first compressed-gas can, a mist generating nozzle, and a hand operated switch/valve. The solvent interfacing tube is inserted into one of the channels of the connector interfacing block and is attached to the solvent-mist generating unit through a solvent limiting funnel. By activating the switch of the first compressed-gas can, a jet of solvent-mist is directed to the end-face of the fiber-optic connector and thereby deposits a limited amount of solvent onto the surface to be cleaned. The compressed-gas delivery unit consists of a second compressed-gas can, a pressure regulator, a particle filter, and a heating block. The compressed-gas from the second gas can is passed to the interfacing block through a pressure regulator, a particle filter, and a heating element. Heated and filtered compressed-gas at a substantially reduced pressure is forced through the alignment sleeve to the fiber-optic connector end-face thereby carrying away dust, dirt, oil deposit, and the solvent.

BRIEF DESCRIPTION OF THE DRAWINGS

The aforementioned objects and advantages of the present invention, as well as additional objects and advantages thereof, will be more readily appreciated hereinafter by reference to a detailed description of a preferred embodiment when taken in conjunction with the following drawings in which.

DETAILED DESCRIPTION OF THE INVENTION

The present invention discloses an improved method and apparatus for cleaning fiber-optic connectors. The improved apparatus utilizes compressed-gas cans which are inexpensive and readily available. The improvements offer a fiber-optic connector cleaning solution that is low-cost and portable.

Figure 1:
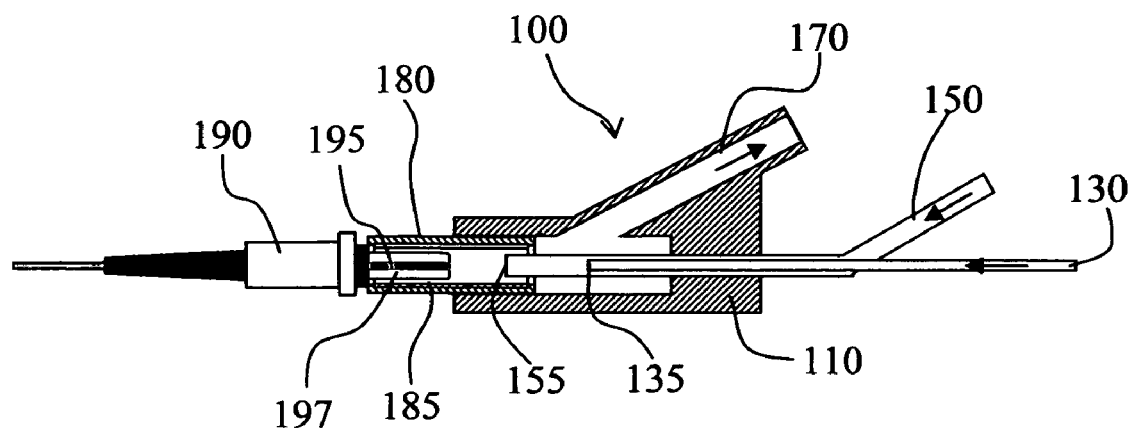
FIG. 1 illustrates the layout of a prior art fiber-optic connector cleaning device.
Figure 2:
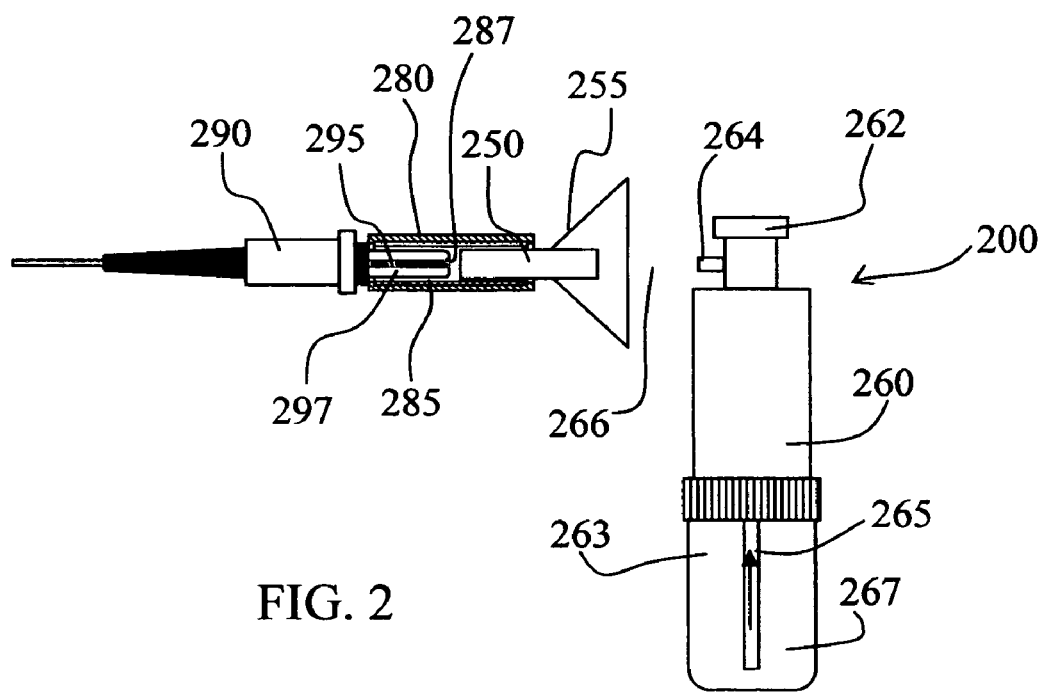
FIG. 2 shows a solvent delivery sub-system of an improved fiber-optic cleaning device.

In accordance with one of the preferred embodiments as illustrated in FIG. 2, a solvent delivery sub-system (200) of an improved fiber-optic connector cleaner deposits a limited amount of solvent to the optical end-face (287) of the connector. The fiber-optic connector (290) has a precision ferrule (297) with optical fiber (295) permanently attached to the center channel of the ferrule. The connector is inserted into a mating adapter (280) containing a precision alignment sleeve (285). The disclosed sub-system (200) consists of an interfacing tube (250), a solvent reservoir (263), an interconnected compressed-gas can (260), a mist generating nozzle (264), and a hand operated switch/valve (262). The interfacing tube (250) is inserted into the alignment sleeve (285) with its outer diameter closely matching that of the fiber-optic connector ferrule (297). The interfacing tube (250) is attached to the solvent-mist generating unit through a solvent limiting funnel (255). The solvent reservoir (267) is in fluid communication with the mist generating nozzle (264), through a solvent delivery tube (265) placed inside of the reservoir. By activating the compressed-gas can switch/valve (262), a jet of solvent-mist (266) is directed to the end-face (287) of the fiber-optic connector and thereby deposits a limited amount of solvent onto the surface to be cleaned. Although not shown explicitly in FIG. 2, the interfacing tube (250) and the solvent limiting funnel (255) may be attached to the mist generating nozzle (264) and the compressed-gas switch/valve (262). Preferably, the outer diameter of the interfacing tube (250) may be close to 2.5 mm, 1.25 mm or 1.6 mm, respectively, to match that of commonly used fiber-optic connector ferrules. The preferred material of the interfacing tube is stainless steel although other materials are also contemplated.

Figure 3:
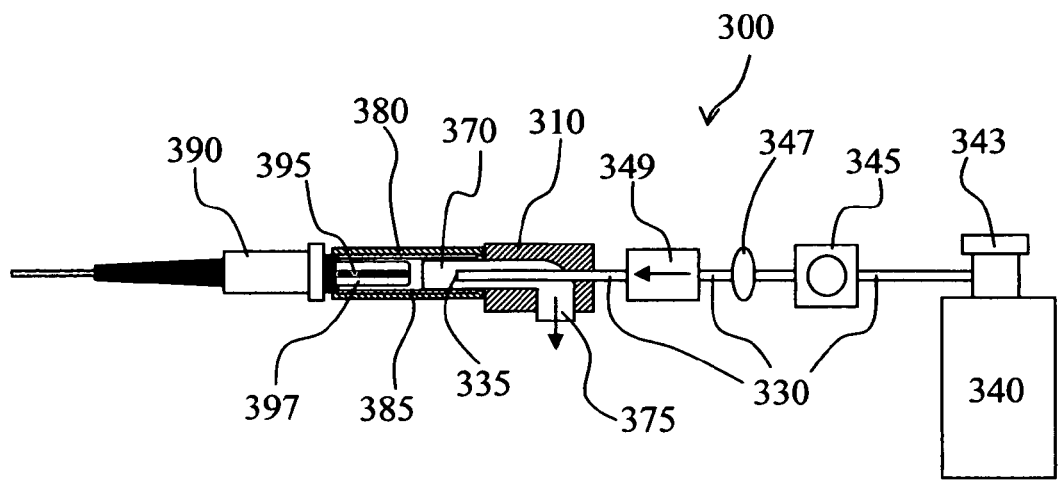
FIG. 3 displays a solvent/contaminant removal sub-system of an improved fiber-optic cleaning device.

Another preferred embodiment of the present invention is illustrated in FIG. 3. The solvent/contaminant removal sub-system (300) of an improved fiber-optic connector cleaner is illustrated which serves to remove solvent and contaminant from optical end-face of the fiber-optic connector (390). The fiber-optic connector (390) has a precision ferrule (397) with an optical fiber (395) permanently attached to the center channel of the ferrule. The connector is inserted into a mating adapter (380) containing a precision alignment sleeve (385). In this preferred embodiment, a solvent/contaminant removal sub-system (300) of the improved fiber-optic connector cleaner consists of an interfacing block (310) and an interconnected compressed-gas delivery unit.

The interfacing block has an interfacing tube (370) to be inserted into the alignment sleeve (385) and two interconnecting channels (330, 375) for compressed-gas delivery and solvent/contaminant removal, respectively. The outer diameter of the interfacing tube (370) is closely matching that of the fiber-optic connector ferrule (397). The compressed-gas from a gas can (340) is in fluid communication with the interfacing block through a pressure regulator (345), a particle filter (347), and a heating element (349). Heated and filtered compressed gas at a substantially reduced pressure is forced through the alignment sleeve to the end-face of the fiber-optic connector thereby carrying away dust, dirt, oil deposit, and the solvent. In one preferred setup, the most suitable operating pressure of the gas flow following the regulator (345) was observed to be 10 psi (pound per square inch) although other pressures were contemplated. Preferably, the interfacing block is made with a solid material such as aluminum, although other solid material may serve equally well. The preferred outer diameter of the interfacing tube may be close to 2.5 mm, 1.25 mm, or 1.6 mm, respectively to match that of commonly used fiber optic connector ferrules. The preferred material of the interfacing tube is stainless steel although other materials were contemplated. One of the suitable compressed-gas cans is the 10 OZ Dust-Off® can manufactured by Falcon Safety Products, Inc. of Branchburg, N.J., although other similar compressed-gas cans may serve equally well. The preferred gas regulator is a miniature regulator obtained from Beswick Engineering Co., Inc. of Greenland, N.H. with a model number PRDB-18. Although a specific regulator is disclosed herein, it should be apparent to those skilled in the art that any other suitable regulator may be used without departing from the scope of the present invention.

Figure 4:
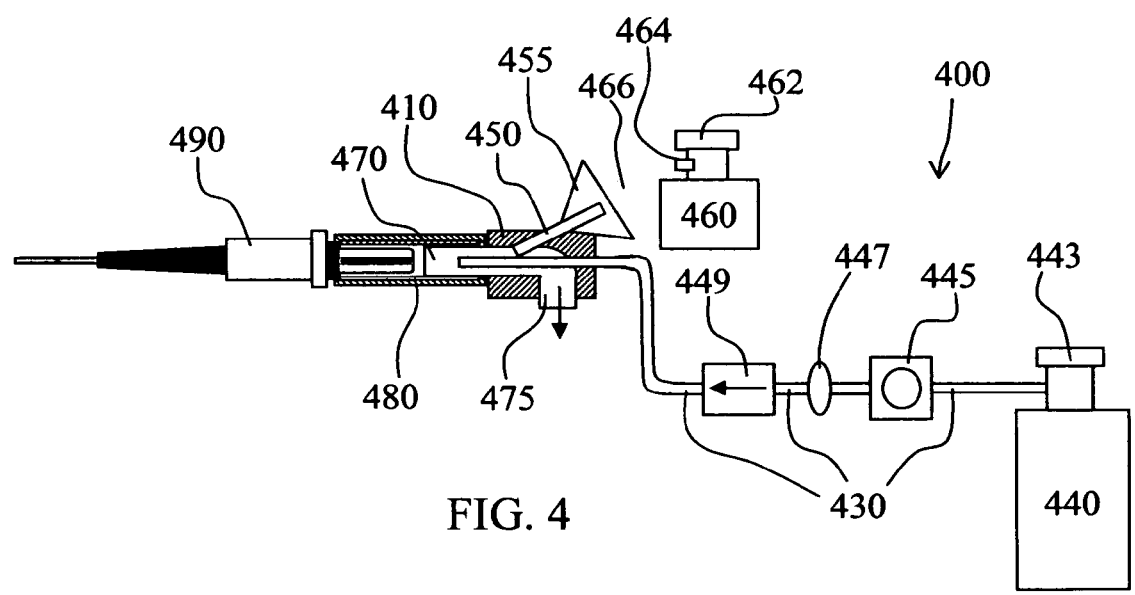
FIG. 4 depicts an alternative design of the improved fiber-optic cleaning device wherein the solvent delivery and solvent removal sub-systems are integrated.

In accordance with an additional preferred embodiment as illustrated in FIG. 4, an improved fiber-optic connector cleaner (400) consists of an interfacing block (410), a solvent delivery unit, and a compressed-gas delivery unit. The fiber-optic connector (490) is inserted into a mating adapter containing a precision alignment sleeve (480). The interfacing block (410) has an interfacing tube (470) to be inserted into the alignment sleeve (480) and three interconnecting channels for solvent-mist delivery (450), compressed-gas delivery (430) and solvent/contaminant removal (475), respectively. The interfacing tube (470) is inserted into the alignment sleeve (480) with its outer diameter closely matching that of the fiber-optic connector ferrule (not shown). The disclosed solvent delivery unit consists of a solvent interfacing tube (450), a solvent reservoir (not shown), an interconnected compressed-gas can (460), a mist generating nozzle (464), and a hand operated switch/valve (462). The solvent interfacing tube (450) is in fluid communication with the solvent-mist generating unit through a solvent limiting funnel (455). The solvent reservoir (not shown) is in fluid communication with the mist generating nozzle (464), through a solvent delivery tube (not shown) placed inside the reservoir. By activating the first compressed-gas can switch (462), a jet of solvent-mist (466) is directed to the end-face of the fiber-optic connector and thereby deposits a limited amount of solvent onto the surface to be cleaned. Although not shown explicitly in FIG. 4, the solvent interfacing tube (450) and the solvent limiting funnel (455) may be attached to the mist generating nozzle (464) and the compressed-gas switch/valve (462). Preferably, the interfacing block is made with a solid material such as aluminum, although other solid materials may serve equally well. The preferred outer diameter of the interfacing tube (470) may be close to 2.5 mm, 1.25 mm, or 1.6 mm, respectively to match that of commonly used fiber optic connector ferrules. The preferred material of the interfacing tube (470) is stainless steel although other materials are also contemplated. The compressed gas from the second compressed-gas can (440) is in fluid communication with the interfacing block through a pressure regulator (445), a particle filter (447), and a heating element (449). Heated and filtered compressed gas at a substantially reduced pressure is forced through the alignment sleeve to the end-face of the fiber-optic connector thereby carrying away dust, dirt, oil deposit, and the solvent. In one preferred setup, the most suitable operating pressure of the gas flow following the regulator (445) was observed to be 10 psi although other pressures were contemplated. One of the suitable compressed-gas cans is the 10 OZ Dust-Off® can manufactured by Falcon Safety Products, Inc. of Branchburg, N.J., although other similar compressed gas cans may serve equally well. The preferred gas regulator is a miniature regulator obtained from Beswick Engineering Co., Inc. of Greenland, N.H. with a model number PRDB-18. Although a specific regulator is disclosed herein, it should be apparent to those skilled in the art that any other suitable regulator may be used without departing from the scope of the present invention.

It will be apparent to those with ordinary skill of the art that many variations and modifications can be made to the method and apparatus of the fiber-optic connector cleaner disclosed herein without departing from the spirit and scope of the present invention. It is therefore intended that the present invention covers modifications and variations of this invention provided that they come within the scope of the appended claims and their equivalents, we claim:

The invention claimed is:

1. A solvent delivery unit of a fiber-optic connector cleaner comprising:
   an interfacing tube being placed substantially close to the end-face of a connector ferrule containing an optical fiber;
   a solvent limiting funnel with its wider opening side facing away from the end-face of the optical fiber;
   a reservoir of solvent having a delivering tube;
   a reservoir of compressed gas;
   a switching valve with one end being connected to said reservoir of compressed gas;
   a nozzle having a small channel being connected to the other end of said switching valve being placed in fluid communication with said reservoir of solvent through said delivering tube.

2. The solvent delivery unit recited in claim 1 wherein said interfacing tube being made with a metallic material.

3. The solvent delivery unit recited in claim 1 wherein said interfacing tube being made with a polymeric material.

4. The solvent delivery unit recited in claim 1 wherein said interfacing tube being made with a composite material.

5. The solvent delivery unit recited in claim 1 wherein said interfacing tube having an outer diameter substantially closed to one of the following values: 2.5 mm, 1.6 mm, and 1.25 mm.

6. The solvent delivery unit recited in claim 1 wherein said interfacing tube having an outer diameter in the range of 0.2 mm to 5 mm.

7. The solvent delivery unit recited in claim 1 wherein said interfacing tube being placed in proximity to the end-face of the said fiber-optic connector having a physical separation of 0.1 mm to 20 mm.

8. The solvent delivery unit recited in claim 1 wherein said solvent limiting funnel being made with a metallic material.

9. The solvent delivery unit recited in claim 1 wherein said solvent limiting funnel being made with a polymeric material.

10. The solvent delivery unit recited in claim 1 wherein said solvent limiting funnel having a diameter in the range of 2 mm to 50 mm.

11. The solvent delivery unit recited in claim 1 wherein said solvent limiting funnel being placed at a physical distance in the range of 0.1 mm to 200 mm from the said nozzle.

12. A solvent removal unit of a fiber-optic connector cleaner comprising:
    an interfacing block having at least two interconnected channels;
    an interfacing tube being inserted into one end of one of said channels of said interfacing block and being placed substantially close to the end-face of a connector ferrule containing an optical fiber;
    a particle filter being placed in fluid communication with one of said channels of the said interfacing block;
    a pressure regulator being placed in fluid communication with the said particle filter;
    a reservoir of compressed gas having a nozzle and a switch being placed in fluid communication with the said regulator.

13. The solvent removal unit recited in claim 12 wherein said interfacing block being made with a metallic material.

14. The solvent removal unit recited in claim 12 wherein said interfacing block being made with a polymeric material.

15. The solvent removal unit recited in claim 12 wherein said interfacing block being made with a composite material.

16. The solvent removal unit recited in claim 12 wherein said interfacing block being made with a mixture of metallic, polymeric, and composite materials.

17. The solvent removal unit recited in claim 12 wherein said interfacing tube being made with a metallic material.

18. The solvent removal unit recited in claim 12 wherein said interfacing tube being made with a polymeric material.

19. The solvent removal unit recited in claim 12 wherein said interfacing tube being made with a composite material.

20. The solvent removal unit recited in claim 12 wherein said interfacing tube having an outer diameter substantially closed to one of the following values: 2.5 mm, 1.6 mm, and 1.25 mm.

21. The solvent removal unit recited in claim 12 wherein said interfacing tube having an outer diameter in the range of 0.2 mm to 5 mm.

22. The solvent removal unit recited in claim 12 wherein said interfacing tube being placed in proximity to the end-face of said fiber-optic connector having a physical separation of 0.1 mm to 20 mm.

23. The solvent removal unit recited in claim 12 wherein said particle filter having fluid passing channels having an average cross section area within the range of 0.01 square micrometers to 100 square micrometers.

24. The solvent removal unit recited in claim 12 wherein said pressure regulator delivering an output pressure in the range of 0.5 psi to 50 psi.

25. The solvent removal unit recited in claim 12 further comprising a heating element being placed in thermal contact with said compressed gas.

26. A fiber-optic connector cleaner comprising:
- an interfacing block having at least three interconnected channels;
- an interfacing tube being inserted into one end of one of said channels of said interfacing block and being placed substantially close to the end-face of a connector ferrule containing an optical fiber;
- a solvent limiting funnel with its wider opening side facing away from the end-face of the optical fiber;
- a reservoir of solvent having a delivering tube;
- a first reservoir of compressed gases;
- a first switching valve with one end being connected to said first reservoir of compressed gas;
- a first nozzle having a small channel being connected to the other end of said first switching valve being placed in fluid communication with said reservoir of solvent through the said delivering tube;
- a particle filter being placed in fluid communication with one of said channels of the said interfacing block;
- a pressure regulator being placed in fluid communication with said particle filter;
- a second reservoir of compressed gas having a second nozzle and a second switch being placed in fluid communication with said regulator.

27. The fiber-optic connector cleaner recited in claim 26 wherein said interfacing block being made with a metallic material.

28. The fiber-optic connector cleaner recited in claim 26 wherein said interfacing block being made with a polymeric material.

29. The fiber-optic connector cleaner recited in claim 26 wherein said interfacing block being made with a composite material.

30. The fiber-optic connector cleaner recited in claim 26 wherein said interfacing block being made with a mixture of metallic, polymeric and composite materials.

31. The fiber-optic connector cleaner recited in claim 26 wherein said interfacing tube being made with a metallic material.

32. The fiber-optic connector cleaner recited in claim 26 wherein said interfacing tube being made with a polymeric material.

33. The fiber-optic connector cleaner recited in claim 26 wherein said interfacing tube being made with a composite material.

34. The fiber-optic connector cleaner recited in claim 26 wherein said interfacing tube having an outer diameter substantially closed to one of the following values: 2.5 mm, 1.6 mm, and 1.25 mm.

35. The fiber-optic connector cleaner recited in claim 26 wherein said interfacing tube having an outer diameter in the range of 0.2 mm to 5 mm.

36. The fiber-optic connector cleaner recited in claim 26 wherein said interfacing tube being placed in proximity to the end-face of said fiber-optic connector having a physical separation of 0.1 mm to 20 mm.

37. The fiber-optic connector cleaner recited in claim 26 wherein said solvent limiting funnel being made with a metallic material.

38. The fiber-optic connector cleaner recited in claim 26 wherein said solvent limiting funnel being made with a polymeric material.

39. The fiber-optic connector cleaner recited in claim 26 wherein said solvent limiting funnel having a diameter in the range of 2 mm to 50 mm.

40. The fiber-optic connector cleaner recited in claim 26 wherein said solvent limiting funnel being placed at a physical distance in the range of 0.1 mm to 200 mm from said first nozzle.

41. The fiber-optic connector cleaner recited in claim 26 wherein said particle filter having fluid passing channels having an average cross section area within the range of 0.01 square micrometers to 100 square micrometers.

42. The fiber-optic connector cleaner recited in claim 26 wherein said pressure regulator delivering an output pressure in the range of 0.5 psi to 50 psi.

43. The fiber-optic connector cleaner recited in claim 26 further comprising a heating element being placed in thermal contact with said compressed gas.

44. A method of cleaning fiber-optic connectors comprising the following steps:
- inserting an interfacing block having at least three interconnected channels into said fiber optic connector;
- delivering compressed gases through one end of said channels of said interfacing block and being placed substantially close to the end-face of a connector ferrule containing an optical fiber;
- filtering said compressed gasses being delivered through said interfacing block;
- regulating the flow rate of the compressed gasses being delivered through said interfacing block;
- removing said interfacing block.

45. A method of cleaning fiber-optic connectors recited in claim 44 further comprising a solvent deposit step prior to the cleaning process.

* * * * *